May 16, 1967  W. C. GROEBER ET AL  3,319,379

FERTILIZER FEEDING TUBES

Filed March 18, 1965

INVENTORS
WILLIAM C. GROEBER
DONALD F. STEARNS
BY
William C. Groeber
Donald F. Stearns United States Patent Office 3,319,379
Patented May 16, 1967

3,319,379
FERTILIZER FEEDING TUBES
William C. Groeber and Donald F. Stearns, both of 4729 Rambo Lane, Toledo, Ohio 43623
Filed Mar. 18, 1965, Ser. No. 440,854
1 Claim. (Cl. 47—48.5)

This invention relates to hollow tubes inserted into a soil body adjacent the root stem of bushes, shrubs, trees and the like for the retention and admixture of fertilizer granules at the bottom end of the tubes into the sub-soil to feed plant roots.

In one preferred embodiment of the tube, the outer wall surface of the tube is fluted on a line with the axis of the tube to form a greater surface area on the tube wall, to increase the amount of water flow of water flowing on the surface of the tube wall to the bottom of the tube, as a result of irrigation or rainfall upon the soil surface. The bottom end of the tube periphery is partially cut away to form a lateral opening at the tube bottom open end so that water flowing down the outer wall surface can blend with fertilizer granules to speed the admixture to the adjacent sub-soil area.

In another preferred embodiment of a fertilizer feeding tube, a tube containing another tube of lesser diameter within its hollow chamber is formed with a cavity between the tube walls to provide a chamber for water to flow directly to the bottom of the tube assembly for admixture with fertilizer granules at the bottom of the inner tube open end which is raised above the plane of the outer tube bottom open end to form an area for greater admixture of water and fertilizer.

With the above and other objects in view, reference is made to the accompanying drawings in which there are illustrated such instances of adaptation as will disclose the broad idea of the invention without limitation to the specific details shown thereon and described herein.

In the accompanying drawings—

Figure 1:
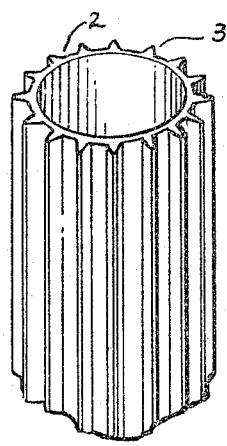
FIGURE 1 is a perspective view of one preferred embodiment of a tube with a fluted outer surface.

In the FIGURE 1, the hollow tube 2 is shown having multiple flutes 3 to achieve a greater surface area on the outside of the tube wall. The lateral openings 4 on the periphery of the tube 2 bottom end are shown in FIGURE 2 to provide an enlarged blending area for admixture of water and fertilizer granules at the tube bottom for dissolution into the adjacent soil area.

Figure 3:
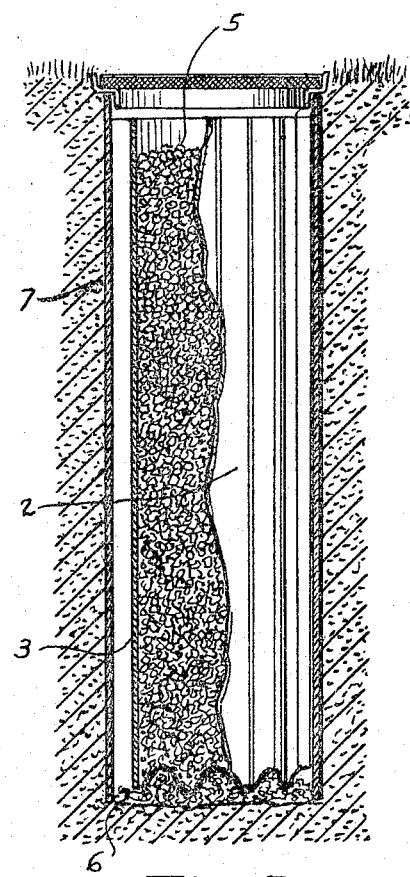
FIGURE 3 is a sectional view of another preferred embodiment of a tube having a tube within its hollow chamber, and inserted upright in a soil body and containing fertilizer granules and a cap member enclosing the tube upper end at a soil body surface.

Another preferred embodiment of this fertilizer feeding tube is shown in FIGURE 3, comprising the inner tube 2 with fertilizer granules 5, an outer enclosing tube 7 being capped at the upper open end with a liquid permeable cap assembly 11, and having a cavity formed between the inner tube 2 and the outer tube 7 for a rapid and direct flow of water or other liquid through the cavity 8 to the bottom of the tube assembly for admixture with the fertilizer granules flowing out from the raised open bottom end 10 of the inner tube 2 for dissolution into the surrounding soil area.

Figure 4:
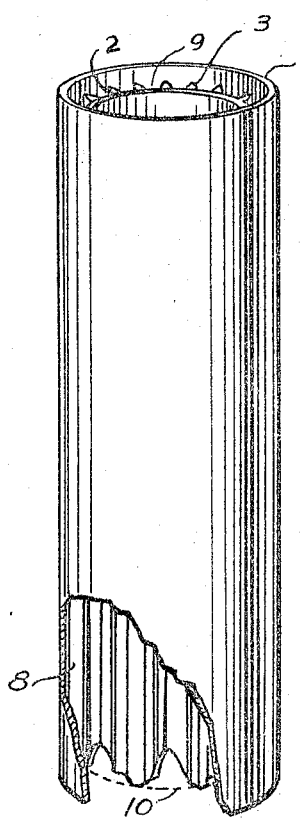
FIGURE 4 is an elevational view of the embodiment shown in FIGURE 3 with a sectional view of the bottom end and showing the elevated end of the inner tube.
Figure 5:
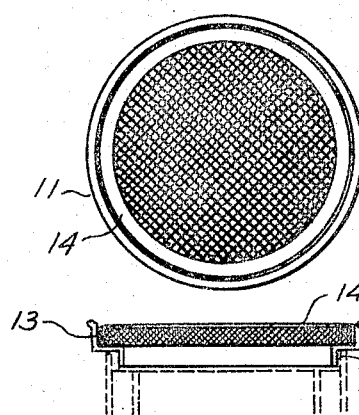
FIGURE 5 is a top view of a cap member assembly showing a liquid permeable crown.
Figure 6:
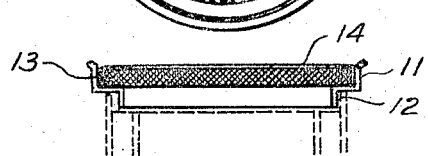
FIGURE 6 is a sectional view of the cap assembly in FIGURE 5.

FIGURE 4 shows the inner tube 2 raised bottom end 10, the recessed upper inner tube end 9, and the cavity 8 between tube 2 and tube 7 in a preferred embodiment shown in FIGURE 3.

Figure 2:
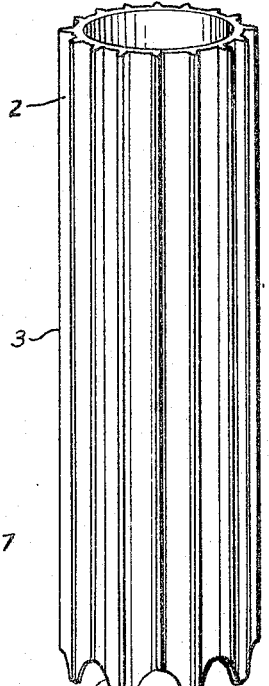
FIGURE 2 is an elevational view in reference to the embodiment shown in FIGURE 1, with openings in the tube wall at the periphery of the bottom end.

A cap assembly 11 comprising a hipped flanged shell member 12 fitted to the wall of tube 2 in the preferred embodiment shown in FIGURE 2, and being fitted to tube 7 in the embodiment shown in FIGURE 3, and enclosing a liquid permeable screen member 13 with a retaining ring 14, is used to crown the fertilizer tubes at the surface of a soil body into which the tubes are recessed.

While there has been illustrated and described two preferred embodiments of the invention, it is to be clearly understood that no limitation is necessarily made to the precise structural details, and the right is reserved to other embodiments thereof which properly fall within the scope of the appended claim.

What is claimed is:

A fertilizer tube assembly for insertion into a soil body to feed plant roots beneath a soil body surface, comprising a hollow outer tube open at both ends and of circular cross section and having nested therein a tube open at both ends having a longitudinally fluted surface defining multiple spaced ribs to form a cavity between the outer and inner tube walls, the bottom end of the inner tube having circumferentially speed axial projections forming lateral end openings, the said outer tube being enclosed at the upper open end with a detachable cap assembly having a liquid permeable surface.

References Cited by the Examiner

UNITED STATES PATENTS

| 1,194,027 | 8/1916 | Kanst | 47—48.5 |
| 1,204,637 | 11/1916 | Anson. | |
| 2,152,707 | 4/1939 | Orr | 47—41.1 |
| 2,741,875 | 4/1956 | Staalduinen | 47—38 |

FOREIGN PATENTS

| 425,328 | 4/1911 | France. |

ABRAHAM G. STONE, *Primary Examiner.*

R. CARTER, *Assistant Examiner.*